(12) United States Patent
Haddock (10) Patent No.: US 8,430,372 B2
(45) Date of Patent: Apr. 30, 2013

(54) ADJUSTABLE MOUNTING ASSEMBLY FOR STANDING SEAM PANELS

(76) Inventor: Robert M. M. Haddock, Colorado Springs, CO (US)

( * ) Notice: Subject to any disclaimer, the term of this patent is extended or adjusted under 35 U.S.C. 154(b) by 0 days.

(21) Appl. No.: 12/832,281

(22) Filed: Jul. 8, 2010

(65) Prior Publication Data

US 2010/0269430 A1    Oct. 28, 2010

Related U.S. Application Data

(63) Continuation of application No. 11/759,172, filed on Jun. 6, 2007, now Pat. No. 7,758,011.

(51) Int. Cl.
*A47B 97/00* (2006.01)
(52) U.S. Cl.
USPC .......................... 248/500; 248/505
(58) Field of Classification Search .......... 411/389; 248/500, 505; 403/167, 168; 52/173.3, 204.1, 52/235; 370/477
See application file for complete search history.

(56) References Cited

U.S. PATENT DOCUMENTS

| | | | |
|---|---|---|---|
| 1,893,481 A | | 1/1933 | Adams |
| 2,525,217 A | * | 10/1950 | Glitsch .................... 292/256.73 |
| 4,189,891 A | * | 2/1980 | Johnson et al. ............ 52/741.13 |
| 4,840,529 A | * | 6/1989 | Phillips ......................... 411/397 |
| 5,251,993 A | * | 10/1993 | Sigourney ....................... 403/52 |
| 5,287,670 A | * | 2/1994 | Funaki ............................ 52/544 |
| 5,491,931 A | | 2/1996 | Haddock |
| 5,533,839 A | * | 7/1996 | Shimada ........................ 405/284 |
| 5,715,640 A | | 2/1998 | Haddock |
| 5,746,029 A | | 5/1998 | Ullman |
| 6,105,317 A | | 8/2000 | Tomiuchi et al. |
| 6,276,285 B1 | * | 8/2001 | Ruch .......................... 108/57.13 |
| 6,622,441 B2 | | 9/2003 | Miller |
| 6,718,718 B2 | | 4/2004 | Haddock |
| 6,918,727 B2 | * | 7/2005 | Huang .......................... 411/389 |
| 7,758,011 B2 | * | 7/2010 | Haddock ....................... 248/500 |
| 7,780,472 B2 | * | 8/2010 | Lenox ........................... 439/567 |
| 2003/0070368 A1 | | 4/2003 | Shingleton |
| 2004/0055233 A1 | | 3/2004 | Showalter |

FOREIGN PATENT DOCUMENTS

| | | |
|---|---|---|
| DE | 100 62 697 A1 | 7/2002 |
| DE | 10 2005 002828 A1 | 8/2006 |
| EP | 0 481 905 A1 | 4/1992 |
| EP | 1 447 494 A2 | 8/2004 |
| JP | 2000 234423 A | 8/2000 |
| JP | 2000 303638 A | 10/2000 |

(Continued)

*Primary Examiner* — Amy J. Sterling
(74) *Attorney, Agent, or Firm* — Marsh Fischmann & Breyfogle LLP (57) ABSTRACT

An adjustable mounting assembly (70*a*/70*b*) for installing solar cell modules (58) on a building surface (34) is disclosed. The mounting assembly (70*a*/70*b*) includes a mounting device (74), a stud (114) that may be threaded to the mounting device (74), a clamping member (142) that may be positioned on the stud (114), and a nut (128) that may be threaded onto the stud (114) to secure the clamping member (142) to the mounting device (74). A nut (126) is fixed to the stud (114) at an intermediate location along its length. This fixed nut (126) may be used to tighten the stud (114) to a mounting device (74), and furthermore may be positioned such that the stud (114) does not extend into a slot (90) of the mounting device (74).

19 Claims, 8 Drawing Sheets

FOREIGN PATENT DOCUMENTS

| | | |
|---|---|---|
| JP | 2003 096986 A | 4/2003 |
| JP | 2004 060358 A | 2/2004 |
| JP | 2004 264009 A | 9/2004 |
| JP | 2006 097291 A | 4/2006 |

* cited by examiner

FIG.1

(PRIOR ART)

ADJUSTABLE MOUNTING ASSEMBLY FOR STANDING SEAM PANELS

CROSS-REFERENCE TO RELATED APPLICATIONS

This patent application is a continuation of, and claims priority under 35 U.S.C. §120 to, U.S. patent application Ser. No. 11/759,172, that is entitled "ADJUSTABLE MOUNTING ASSEMBLY FOR STANDING SEAM PANELS," that was filed on Jun. 6, 2007, now U.S. Pat. No. 7,758,011, and the entire disclosure of which is hereby incorporated by reference in its entirety herein.

FIELD OF THE INVENTION

The present invention generally relates to installing structures on surfaces defined by standing seam panels and, more particularly, to a mounting assembly that may be installed on a standing seam and on which one or more structures may be secured.

BACKGROUND OF THE INVENTION

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic cell module. Multiple photovoltaic cell modules may be installed in one or more rows on a roofing surface to define an array.

Figure 1:
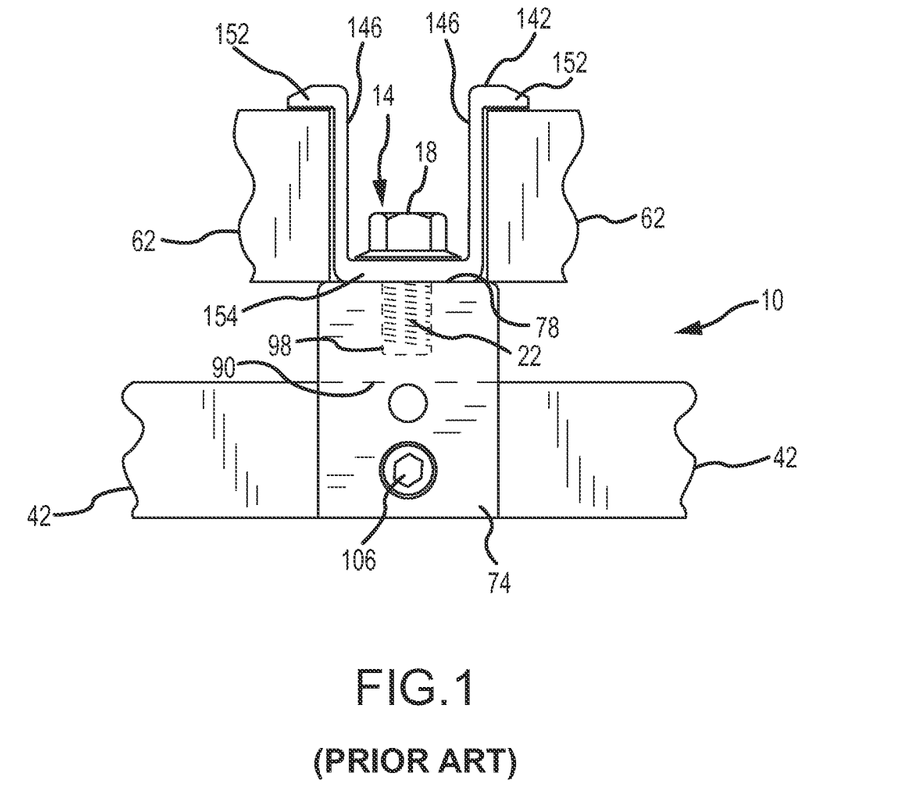
FIG. 1 is a side view of a prior art mounting assembly for interconnecting solar cell modules with a standing seam roof.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole 158 in a base 154 of the clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping number 142 includes a pair of clamping legs 146, where each clamping leg 142 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY OF THE INVENTION

A first aspect of the present invention is embodied by a mounting assembly for standing seam panels. Components of this mounting assembly include a mounting device, a stud, and a clamping member. The mounting device may be attached to a standing seam. A first stud end is spaced from the mounting device when the stud is mounted to the mounting device. As such, the clamping member may be positioned onto the first stud end and then disposed somewhere along the length of the stud.

A second aspect of the present invention is embodied by a mounting assembly. Components of this mounting assembly include a mounting device, a stud, a clamping member, and a first nut. The mounting device may be attached to an appropriate surface, such as a standing seam. The stud extends from the mounting device, through a base of the clamping member, and to a first stud end that is thereby spaced from the mounting device. Other portions of the clamping member include first and second clamping legs that are disposed in opposing relation and that each extend from the base of the clamping member in a direction that is at least generally away from the mounting device. These first and second clamping legs at least partially define first and second pockets in which a structure to be clamped by the mounting assembly may be disposed. In this regard, a first nut is threaded onto the first stud end and is able to exert a clamping force on the base of the clamping member. Increasing the amount of threaded engagement between the first nut and the stud causes the first nut to exert a force on the clamping member and direct the same at least generally toward the mounting device.

Various refinements exist of the features noted in relation to each of the first and second aspects of the present invention. Further features may also be incorporated in each of the first and second aspects of the present invention as well. These refinements and additional features may exist individually or in any combination in relation to each of the first and second aspects. Unless otherwise noted, the following discussion pertains to each of the first and second aspects.

The mounting assembly may be installed on any appropriate surface, such as a building surface. This building surface may be in the form of a roof, and also may be in the form of siding. In one embodiment, the mounting device is installed on a standing seam defined by an adjacent pair of interconnected panels that are typically fabricated from a metal or a metal alloy. Each of the components of the mounting assembly may be of any appropriate size, shape, configuration, and/or type, may be formed from any appropriate material or combination of materials, or both. For instance, each of the components of the mounting assembly may be formed from an appropriate metal or metal alloy.

The mounting device may be installed on a standing seam without penetrating or piercing the standing seam. In this regard, the mounting device may include a slot in which a standing seam may be disposed. At least one fastener may extend through the mounting device and engage a standing seam that is at least partially disposed within the slot. In one embodiment, each such seam-engaging fastener includes a convex, rounded, or blunt-nose end for interfacing with a standing seam in a manner that forces the standing seam against the opposing sidewall of the slot for the mounting device.

The stud may interface with the mounting device in any appropriate manner. For instance, the stud may be threaded onto/into the mounting device. Further in this regard, the stud may be characterized as having a second stud end that is oppositely disposed from the first stud end, where the stud includes first and second threaded sections. The first threaded section may extend from the first stud end toward the second stud end. Similarly, the second threaded section may extend from the second stud end toward the first threaded section. In one embodiment, the second stud end is threaded into the mounting device, but does not extend into a seam-receiving slot of the mounting device.

A nut may be fixed to the stud at an intermediate location along its length dimension, for instance somewhere along the stud between its first and second stud ends to define the above-noted first and second threaded sections. The first threaded section may be located at least somewhere between this nut and the first stud end, while the second threaded section may be located at least somewhere between this nut and the second stud end. In one embodiment, the length of the first threaded section is at least about 1.5 inches. In one embodiment, the nut is located along the length of the stud such that the second stud end cannot extend into the above-noted slot. Therefore, tightening the stud onto the mounting device should not cause the second stud end to project into the slot, where it could damage the standing seam.

The stud may be of any appropriate length. Moreover, the stud may be threaded over at least a certain segment extending from its first stud end so that the clamping member may be disposed at multiple locations along this threaded segment. In one embodiment, this threaded segment extends from the first stud end a distance of at least about 1.5 inches. Incorporating a stud having a threaded segment extending at least a certain length from its first stud end allows the mounting assembly to clamp onto structures having a variety of different thicknesses. Different solar cell module manufacturers may use frames of different thicknesses, so the mounting assembly may be used to install solar cell modules from different manufactures.

The mounting assembly may also include a first nut that is threaded onto the first stud end and that may engage the clamping member to clamp an appropriate structure to the mounting assembly. Consider the case where the clamping member includes first and second clamping legs that are disposed in opposing relation. In one embodiment, the mounting assembly is disposed between a pair of structures (e.g., solar cell module frames). The first clamping leg may clamp a first structure to the mounting assembly, while the second clamping leg may clamp a second structure to the mounting assembly. For instance, the first clamping leg may interface with a first solar cell module frame that crosses a standing seam at one location, while the second clamping leg may interface with a second solar cell module frame that crosses the same standing seam at a different location (e.g., the second solar cell module frame may be located closer to an edge of the roof than the first solar cell module frame).

In another embodiment, the above-noted clamping member is retained between the noted first nut and another second nut that is also threaded onto the first stud end (e.g., the second nut being threaded onto the stud prior to positioning the clamping member onto the stud). Having a nut "above" and "below" the clamping member may be utilized to stabilize the same in at least certain situations. Consider the case where the clamping member includes first and second clamping legs that are disposed in opposing relation. In one embodiment, the first clamping leg engages a first structure, while the second clamping leg is unused. For instance, the mounting assembly may be located toward the edge of the roof, and may need to clamp onto only a single solar cell module frame (e.g., the second clamping leg may be located closer to the edge of a roof than the first clamping leg). Having the clamping member be "clamped" between the first and second nuts stabilizes the clamping member on the stud in this type of a situation.

The mounting assembly may also include a mounting plate that is disposed somewhere between the clamping member and the mounting device, for instance with the mounting plate being disposed directly on the mounting device. The stud may extend through an appropriate aperture or hole in the mounting plate. This mounting plate may be clamped onto the mounting device, for instance by incorporating the above-noted fixed nut on the stud. The mounting plate may be appropriate for use with any sized mounting device, but may be of more benefit for use in conjunction with smaller mounting devices (e.g., to provide a desirably large surface for interfacing with a structure being clamped by the mounting assembly). The mounting plate has a surface area of at least about 5 inches$^2$ in one embodiment, and at least about 7 inches$^2$ in another embodiment. The mounting plate may be of any appropriate size, shape, and/or configuration.

DETAILED DESCRIPTION

Figure 2:
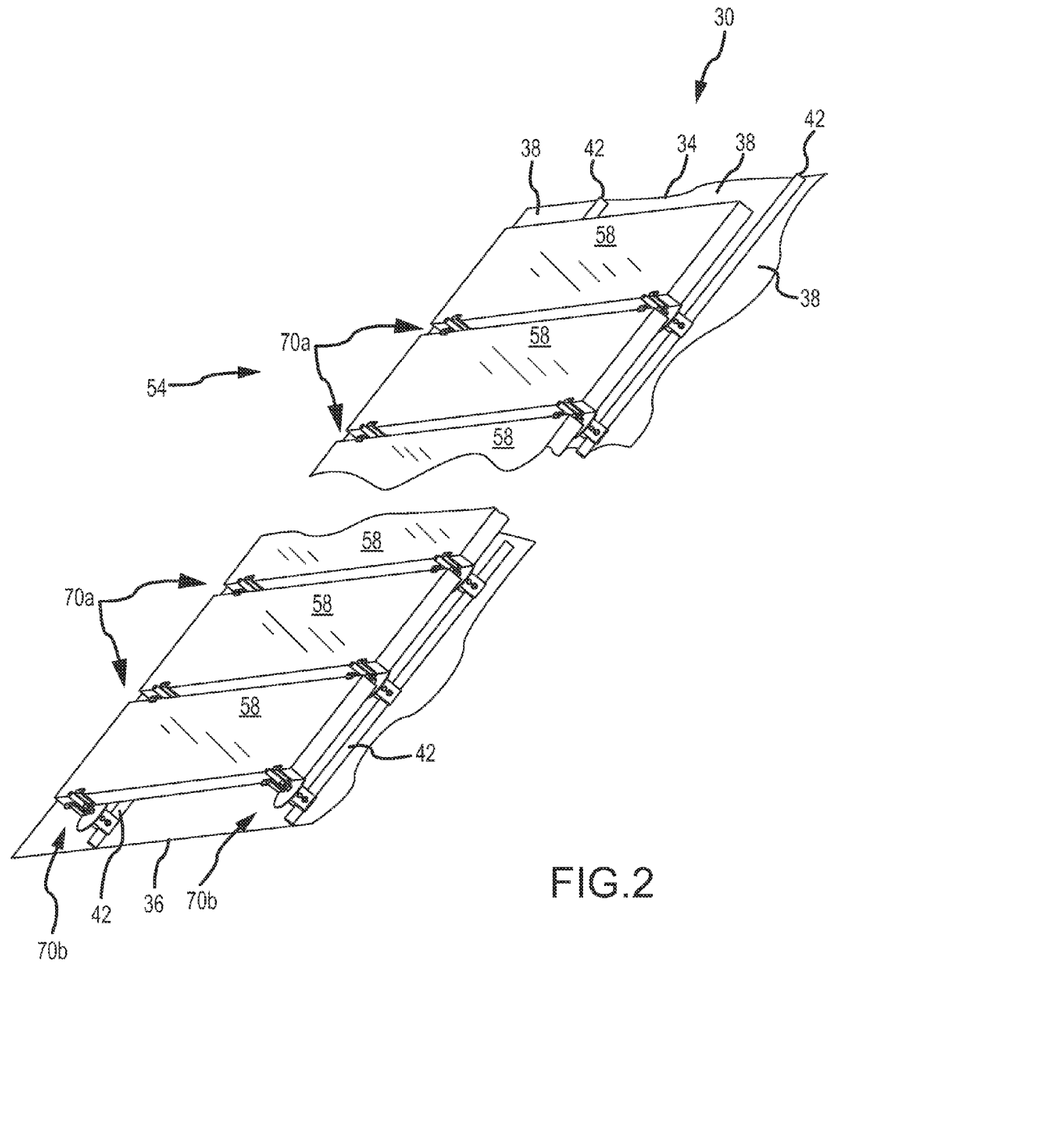
FIG. 2 is a perspective view of a plurality of solar cell modules installed on a standing seam building surface using a plurality of adjustable mounting assemblies.

FIG. 2 illustrates an assembly 30 in the form of a building surface 34, a solar cell array 54 defined by a plurality of solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
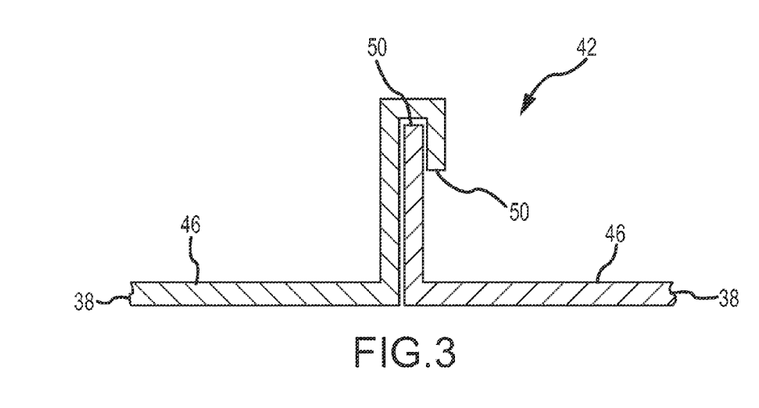
FIG. 3 is a cross-sectional schematic of a representative standing seam defined by interconnecting a pair of panels.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

Figure 4:
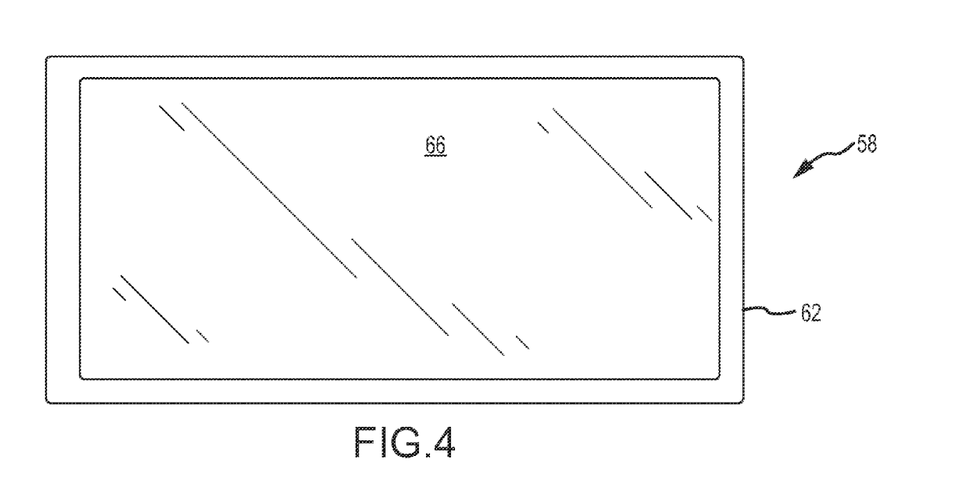
FIG. 4 is a top view of one of the solar cell modules illustrated in FIG. 2.

A more detailed view of one of the solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
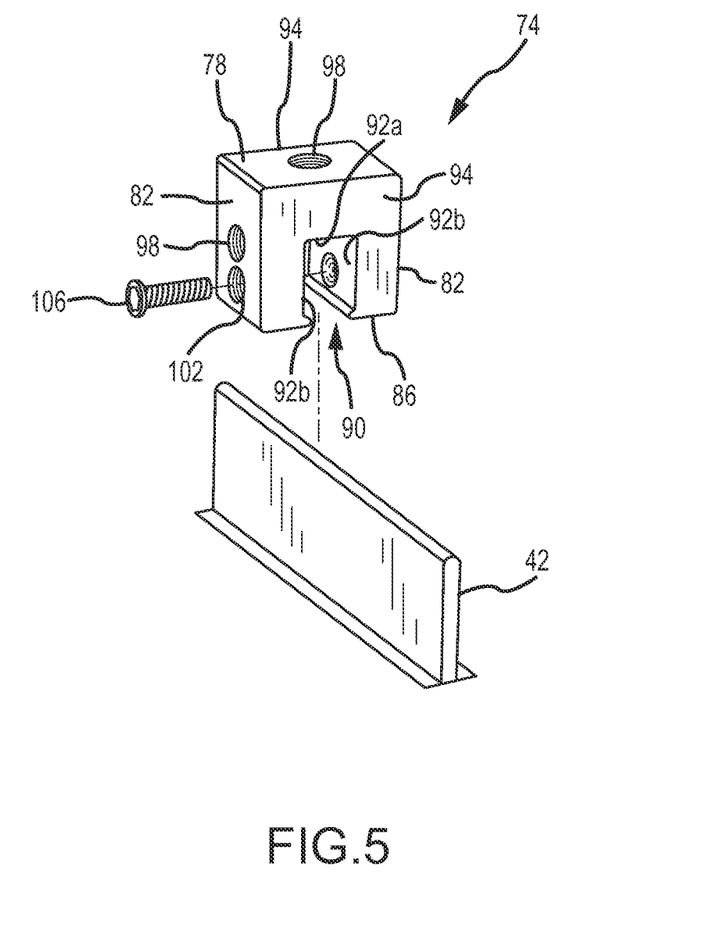
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
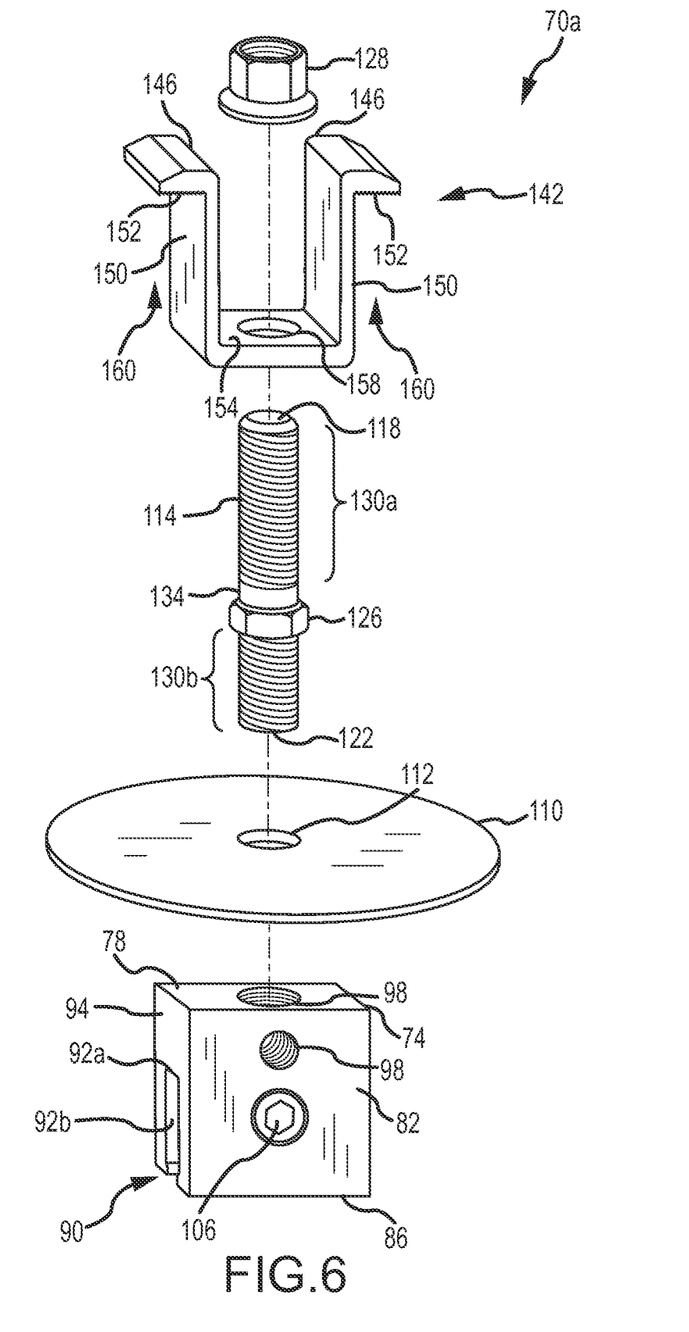
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
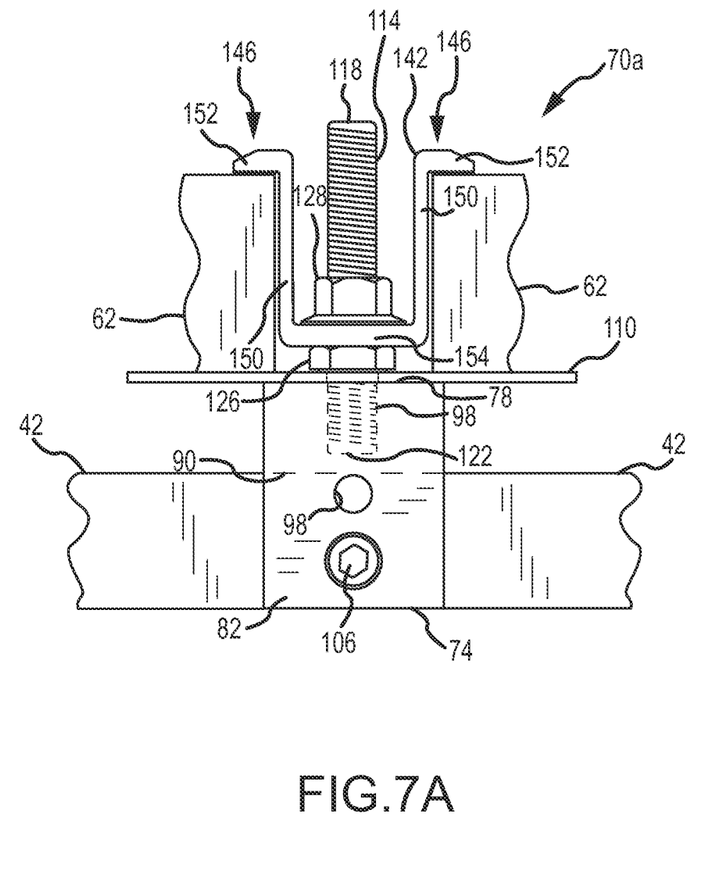
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
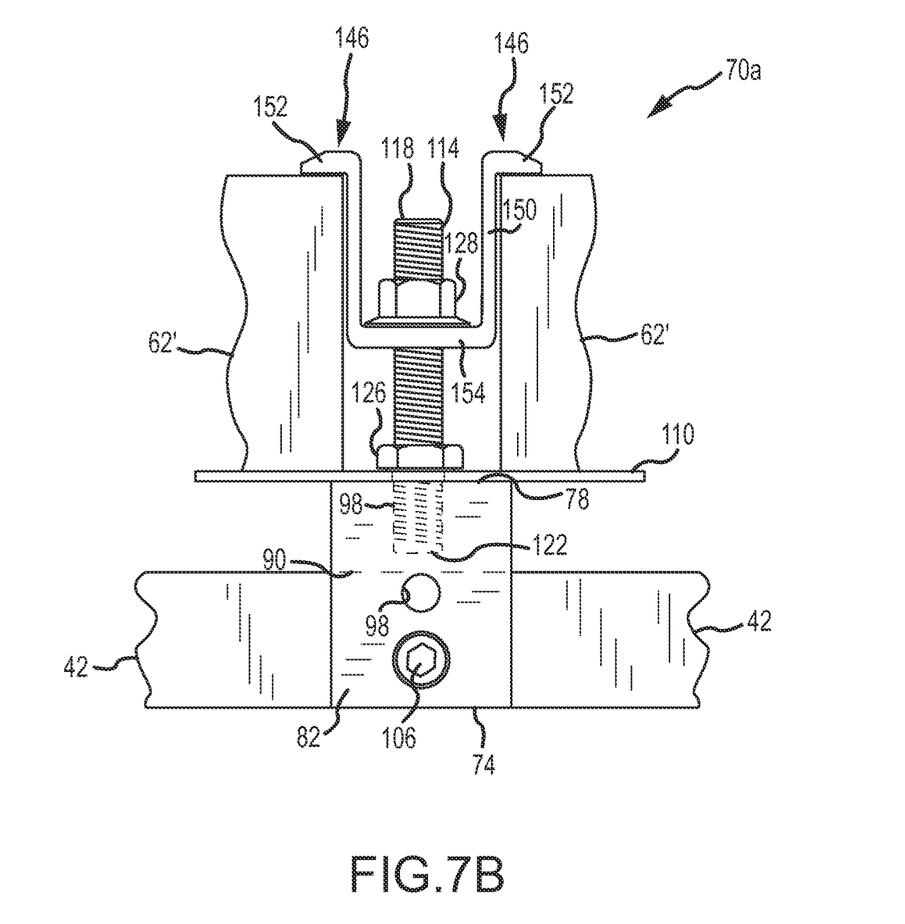
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
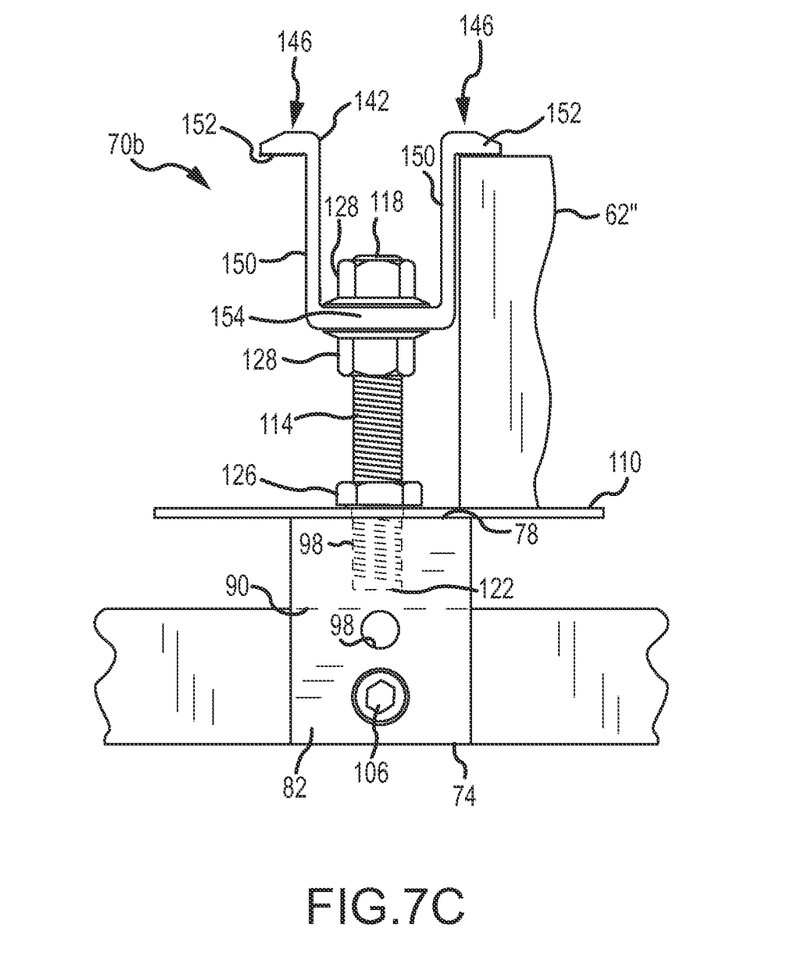
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A solar cell module mounting assembly, comprising:
   a mounting device adapted for attachment to a building surface;
   a removable mounting plate comprising upper and lower surfaces, wherein said mounting plate is positioned directly on an upper surface of said mounting device such that part of said lower surface of said mounting plate interfaces with said upper surface of said mounting device, and wherein said mounting plate extends beyond an outer perimeter of said mounting device to accommodate supporting a pair of solar cell modules when positioned on said upper surface of said mounting plate;
   a clamping member comprising a base and first and second clamping legs that are disposed in opposing relation and that extend upwardly from said base;
   a removable stud comprising first and second stud ends, wherein said stud extends though said base of said clamping member, then through said mounting plate, and then into threaded engagement with said mounting device;
   a first nut threaded onto said first end of said stud and engaged with a first side of said base of said clamping member; and
   a second nut positioned on said stud on a second side of said base of said clamping member, wherein said second side of said base of said clamping member projects in a direction of said upper surface of said mounting plate, wherein said second nut is spaced from said second stud end and is engaged with said upper surface of said mounting plate and clamps said mounting plate onto said mounting device, and wherein said stud extends upwardly from said base of said clamping member to said first stud end.

2. The solar cell module mounting assembly of claim 1, wherein said clamping member is positionable between a pair of adjacently disposed solar cell modules.

3. The solar cell module mounting assembly of claim 1, wherein said first and second clamping legs are adapted to simultaneously engage first and second solar cell modules, respectively, that are adjacently disposed.

4. The solar cell module mounting assembly of claim 1, wherein said stud comprises first and second threaded sections, wherein said second nut is located between said first and second threaded sections, wherein said first threaded section extends from said first stud end toward said second nut, and wherein said second threaded section extends from said second stud end toward said second nut.

5. The solar cell module mounting assembly of claim 4, wherein said second nut is fixed to said stud so as to not move relative to said stud.

6. The solar cell module mounting assembly of claim 5, further comprising an unthreaded section between said second nut and said first threaded section.

7. The solar cell module mounting assembly of claim 4, further comprising an unthreaded section between said second nut and said first threaded section.

8. The solar cell module mounting assembly of claim 1, wherein said second nut is fixed to said stud so as to not move relative to said stud.

9. The solar cell module mounting assembly of claim 8, further comprising an unthreaded section extending from said second nut toward said first stud end, wherein said first nut is positionable anywhere between said first stud end and said unthreaded section.

10. The solar cell module mounting assembly of claim 1, further comprising an unthreaded section extending from said second nut toward said first stud end, wherein said first nut is positionable anywhere between said first stud end and said unthreaded section.

11. The solar cell module mounting assembly of claim 1, wherein a threaded section extending from said first stud end toward said second nut is at least about 1.5 inches long.

12. The solar cell module mounting assembly of claim 1, wherein said stud comprises a first threaded section that extends from said first stud end toward said second stud end, wherein said clamping member may be disposed at any location along said first threaded section.

13. The mounting assembly of claim 12, wherein disposing said clamping member at different locations along said first threaded section accommodates clamping solar cell modules of different thicknesses with said solar cell module mounting assembly.

14. The solar cell module mounting assembly of claim 1, wherein said mounting plate has a surface area of at least about 5 in.$^2$.

15. The solar cell module mounting assembly of claim 1, wherein said first and second nuts engage said first and second sides, respectively, of said base of said clamping member, respectively, when said solar cell module mounting assembly is in a first clamping configuration, and wherein said first nut engages said first side of said base of said clamping member and said second nut is spaced from said second side of said base of said clamping member when said solar cell module mounting assembly is in a second clamping configuration.

16. The solar cell module mounting assembly of claim 1, wherein said clamping member is at least generally U-shaped, and wherein said stud extends into an open space between said first and second clamping legs of said clamping member when said clamping member is positioned on said stud via said first stud end.

17. The solar cell module mounting assembly of claim 1, further comprising a third nut threaded onto said first stud end, wherein said first and third nuts engage said first and second sides, respectively, of said base of said clamping member, and wherein said third nut is located between said first and second nuts along said stud.

18. A building assembly comprising the solar cell module mounting assembly of claim 1 and a first solar cell module, wherein said first clamping leg of said clamping member engages said first solar cell module, and wherein said second clamping leg of said clamping member is unused.

19. A building assembly comprising the solar cell module mounting assembly of claim 1, a first solar cell module, and a second solar cell module, wherein said first clamping leg of said clamping member engages said first solar cell module, and wherein said second clamping leg of said clamping member engages said second solar cell module.

* * * * *